United States Patent [19]

Tsukamoto et al.

[11] Patent Number: 5,008,040

[45] Date of Patent: Apr. 16, 1991

[54] PROCESS FOR PREPARATION OF POLYACETYLENE FILM

[75] Inventors: Jun Tsukamoto, Otsu; Akio Takahashi, Kusatsu, both of Japan

[73] Assignee: Director-General of Agency of Industrial Science and Technology, Tokyo, Japan

[21] Appl. No.: 250,735

[22] Filed: Sep. 29, 1988

[30] Foreign Application Priority Data

Feb. 9, 1988 [JP] Japan .................................. 63-26537
Apr. 19, 1988 [JP] Japan .................................. 63-94504

[51] Int. Cl.$^5$ ......................... H01B 1/00; H01B 1/06
[52] U.S. Cl. .................................. 252/500; 252/518; 526/285; 526/113; 526/116; 526/120; 526/128; 526/133; 524/80; 524/401
[58] Field of Search ............... 252/500, 518; 526/285, 526/62, 113, 116, 120, 128, 133; 524/80, 401

[56] References Cited

U.S. PATENT DOCUMENTS

| | | | |
|---|---|---|---|
| 4,394,304 | 7/1983 | Wnek | 252/500 |
| 4,488,987 | 12/1984 | Hocker et al. | 252/518 |
| 4,600,756 | 7/1986 | Pedretti et al. | 526/134 |
| 4,734,343 | 3/1988 | Berthier et al. | 252/500 |
| 4,772,421 | 9/1988 | Ikenaga et al. | 252/500 |

FOREIGN PATENT DOCUMENTS

| | | |
|---|---|---|
| 1221521 | 5/1987 | Canada . |
| 131968 | 1/1985 | European Pat. Off. . |
| 247517 | 12/1987 | European Pat. Off. . |
| 3617502 | 11/1987 | Fed. Rep. of Germany . |

OTHER PUBLICATIONS

N. Theophilou, "ESR Study of the —", Synthetic Metals, vol. 16, (1986), pp. 337–342.
H. Naarmann, "New Process for —", Synthetic Metals, vol. 22, (1987), pp. 1–8.
K. Akagi, "Highly Conductive –", Synthetic Metals, vol. 17, (1987), pp. 241–246.

*Primary Examiner*—Josephine Barr
*Attorney, Agent, or Firm*—Cushman, Darby & Cushman

[57] ABSTRACT

A polyacetylene film having a high electroconductivity is prepared by (a) heating a Ziegler-Natta catalyst at a temperature not lower than 150° C. in an organic solvent and then, cooling the catalyst-solvent mixture, (b) removing coarse catalyst particles having a diameter of larger than 1 μm from the catalyst-solvent mixture by filtration to form a catalyst dispersion for polymerization, (c) introducing acetylene into the catalyst dispersion to effect polymerization of acetylene, and (d) drawing the formed polymer and treating the drawn polymer with a dopant.

8 Claims, No Drawings

PROCESS FOR PREPARATION OF POLYACETYLENE FILM

BACKGROUND OF THE INVENTION (1) Field of the Invention

The present invention relates to a process for the preparation of polyacetylene having a high electroconductivity. Polyacetylene prepared by the process of the present invention can be widely used for a battery material, an electric part material and other electronic materials.

(2) Description of the Related Art

The synthesis of polyacetylene has long been investigated, and the process using a Ziegler-Natta catalyst, proposed by Shirakawa et al, is the most popular known process [see, for example, J. Polym. Sci Polym. Ed., 12, 11 (1974)]. Japanese Unexamined Patent Publication No. 59-51904 discloses a process in which polyacetylene having an electroconductivity of $2 \times 10^3$ S/cm is prepared by the steps of heat-treating (hereinafter referred to as "aging") a Ziegler-Natta catalyst at 20° to 100° C. in an organic solvent, polymerizing acetylene using this catalyst, and then doping iodine into the formed polymer.

Furthermore, from Synthetic Metals, 17, 241 (1987), a process is known in which polyacetylene having an electroconductivity of $4.8 \times 10^3$ S/cm is obtained by polymerizing acetylene in a liquid crystal solvent by using a Ziegler-Natta catalyst, and doping iodine into the formed polymer.

Moreover, in Synthetic Metals, 22, 1 (1987), a process is reported in which polyacetylene having an electroconductivity of $2 \times 10^4$ S/cm is synthesized by heat-treating a Ziegler-Natta catalyst at 120° C. in a silicone solvent, polymerizing acetylene by using the formed catalyst solution, and then doping iodine in the formed polymer In this process, if a reducing agent such as butyl lithium is incorporated just before the polymerization, a polymer having such a high electroconductivity as about $1 \times 10^5$ S/cm can be obtained. However, the incorporation of a reducing agent such as butyl lithium is complicated, and therefore, a simpler process is desired.

SUMMARY OF THE INVENTION

A primary object of the present invention is to provide a simple process for the preparation of a polyacetylene film having an electroconductivity comparable to that of a metal.

In accordance with the present invention, there is provided a process for the preparation of a polyacetylene film, which comprises (a) heating a Ziegler-Natta catalyst at a temperature not lower than 150° C. in an organic solvent and then, cooling the catalyst-organic solvent mixture, (b) removing coarse catalyst particles having a diameter larger than 1 μm from the catalyst-organic solvent mixture to form a catalyst dispersion for polymerization, (c) introducing acetylene into the catalyst dispersion to effect polymerization of acetylene, and (d) drawing the formed polymer and treating the drawn polymer with a dopant.

DESCRIPTION OF THE PREFERRED EMBODIMENTS

By the organic solvent referred to in the present invention is meant a saturated hydrocarbon, aromatic hydrocarbon or organic silicon compound, which is capable of dissolving or dispersing the Ziegler-Natta catalyst therein and has a boiling point of 150 to 300° C. As specific examples of the solvent, there can be mentioned saturated hydrocarbons such as liquid paraffin, hexadecane, decalin, decane, tetradecane, tetralin, indene and Isopher M (saturated aliphatic hydrocarbon supplied by Exxon Chemical), and aromatic hydrocarbons such as cyclohexylbenzene, 1,1-phenylethane, diphenyl ether, dibenzyl ether, dipentene, 1,2-dimethylnaphthalene, 3,3'-dimethylbiphenyl and dimethoxybenzene. Furthermore, in the present invention, liquid crystals exhibiting a nematic phase at a temperature of −78° to 50° C. are also used. More specifically, p-alkoxybenzylidene-p-alkylaniline type and p-alkoxyphenylcyclohexane type liquid crystals are preferably used as the liquid crystal solvent not impairing the catalyst activity. As the organic silicon compound, there can be mentioned dimethyl silicone oil and methylphenyl silicone oil. These solvents can be used singly or in the form of a mixture of two or more thereof.

The Ziegler-Natta catalyst used in the present invention is a binary catalyst comprising an organic metal compound and a transitional metal compound in combination.

As specific examples of the organic metal compound, there can be mentioned triethylaluminum, diethylaluminum chloride, ethylaluminum dichloride, trimethylaluminum, dimethylaluminum chloride, methylaluminum dichloride, tributylaluminum, dibutylaluminum chloride, butylaluminum dichloride, triethylboron, diethylboron chloride and ethylboron trichloride. These organic metal compounds can be used singly or in the form of a mixture of two or more thereof.

As the transitional metal, there can be mentioned titanium, zirconium, vanadium, cerium, neodymium, niobium and tantalum. As specific examples of the transitional metal compound, there can be mentioned titanium tetra-alkyl oxide, zirconium tetra-alkyl oxide, neodymium trialkyl oxide, vanadium diacetylacetonate, titanium triacetylacetonate, iron triacetylacetonate, chromium triacetylacetonate, titanium trichloride, titanium tetrachloride, nickel trichloride, iron trichloride, niobium pentachloride, molybdenum pentachloride and tantalum pentachloride. Among these catalyst systems, a combination of an aluminum compound and a titanium compound is preferred, and a combination of triethylaluminum and titanium tetrabutoxide is especially preferred.

To obtain a film having a good quality, preferably the transitional metal concentration is 0.05 to 1.4 mole/l, and the molar ratio of the organic metal compound to the transitional metal compound is from 1 to 5.

A catalyst solution or dispersion is formed by dissolving or dispersing the above-mentioned catalyst in the above-mentioned polymerization solvent, and the catalyst solution or dispersion is heat-treated at a temperature not lower than 150° C. preferably in argon gas or under a reduced pressure. If the heat treatment temperature is lower than 150° C., the intended polyacetylene film having a high electroconductivity cannot be obtained. If the heat treatment temperature is too high, decomposition of the catalyst sometimes occurs, and therefore, preferably the heat treatment temperature is up to 260° C. The reaction time is preferably 20 to 120 minutes, and after the reaction, the catalyst-solvent mixture is cooled to a temperature lower than 50° C., preferably to room temperature.

To improve the electroconductivity, preferably the heating/cooling aging treatment is repeated at least two times, especially 2 to 4 times.

When the catalyst is dissolved in the polymerization solvent, the catalyst is substantially homogeneously dissolved in the polymerization solvent. However, during the above-mentioned heat treatment, it is found that because of agglomeration of the catalyst, a suspension or a dispersion of coarse particles is formed. At the polymerization step for formation of polyacetylene, this particle dispersion is included in the polymer to degrade the orientability of the polymer and to cause defects in the polymer. Accordingly, in the present invention, purification by removal of coarse catalyst particles having a diameter larger than 1 μm is indispensable.

To maintain the acetylene-polymerizing activity, the removal of coarse catalyst particles can be carried out by filtration or centrifugal separation in an atmosphere of an inert gas such as argon or nitrogen. For example, there can be mentioned a method in which a syringe filter formed by covering a membrane filter (filter paper) with polyethylene, nylon, polypropylene, denaturalized acrylic resins or Teflon is attached to a syringe (injector) and filtration is effected by extruding the catalyst dispersion by utilizing the compressing force of the syringe. The compressing pressure is preferably several $kg/cm^2$ to 10 $kg/cm^2$.

Preferably the pore diameter of the membrane filter is about 0.2 to about 1 μm, especially 0.2 to 0.5 μm. If the pore diameter if smaller than 0.2 μm, the filtration rate tends to decrease, the filtration pressure is elevated and the filtration often becomes difficult. If the pore diameter exceeds 1 μm, the effect of the purification by filtration is reduced.

As the material of the membrane filter, there can be mentioned cellulose acetate, nylon and Teflon. Of these, Teflon is most preferred because of insolubility in the catalyst solution.

According to one embodiment of the present invention for preparing an electroconductive polyacetylene film, at first, the Ziegler-Natta catalyst is dissolved or dispersed in the organic solvent, the catalyst solution or dispersion is aged by the heating-cooling treatment, the thus-obtained catalyst dispersion is purified by filtration, the purified catalyst dispersion is coated on the wall surface of a polymerization vessel or the surface of a solid not reacting with the catalyst (for example, a glass, a film, a metal, a woven fabric and a leather can be mentioned and a solid supported by a substrate is preferred) to form a liquid film of the catalyst dispersion, and acetylene is then introduced. According to this method, a polyacetylene film is obtained in the coated catalyst dispersion on the wall surface or substrate. When polymerization is carried out while stirring the catalyst dispersion violently, a blackish brown powdery acetylene polymer is obtained.

The above-mentioned polymerization of acetylene can be conducted at an optional temperature of −78° to 50° C. If the polymerization is carried out at a low temperature of about −78° C., the rate of reaction is reduced, and a drawable cis-form polyacetylene having a high elasticity can be obtained. If the polymerization is carried out at a higher temperature, polyacetylene containing a trans-form polymer is formed.

To obtain polyacetylene having a high electroconductivity, acetylene gas having an ultra-high purity (having a purity of at least 99.9999% by volume; supplied by Koatsu Gas Kogyo) is preferably used as the acetylene monomer to be introduced, and more preferably this acetylene is passed through a 30% solution of triethylaluminum in liquid paraffin to remove impurities such as oxygen and water as much as possible. The pressure of introduced acetylene is preferably 100 to 1,140 mmHg.

The polymerization time is not particularly critical and depends on the intended thickness of the polyacetylene film, the catalyst concentration, the pressure of the acetylene monomer and other factors, but the polymerization time is usually 2 to 24 hours.

In the present invention, the thus-obtained polyacetylene film is drawn and treated with a dopant, whereby an intended film having a high electroconductivity is obtained. As the dopant, iodine vapor and an aluminum trichloride solution are preferably used.

The present invention will now be described in detail with reference to the following examples.

EXAMPLE 1

A glass reactor having an inner capacity of 600 ml was charged with 13 ml of decalin $C_{10}H_{18}$ in an argon atmosphere, and 9 ml of triethyl aluminum $[(C_2H_5)_3Al]$ and 11 ml of titanium tetrabutoxide $[(n-C_4H_9O)_4Ti]$ were added with stirring. The mixture was allowed to stand at room temperature for 30 minutes, and the formed catalyst solution was gradually heated to about 120° C. in an oil bath under evacuation by suction by a vacuum pump. Then, the reactor was placed in an argon atmosphere again, and the catalyst solution was refluxed at 200° C. under atmospheric pressure while circulating argon at a rate of 500 ml/min. Heat aging was carried out at 200° C. for 2 hours, and the thus-obtained catalyst dispersion was rapidly cooled to room temperature in a cooling water bath. The cooled catalyst dispersion was purified in an argon atmosphere by filtration using a syringe having a capacity of 50 ml and a syringe filter having a pore diameter of 0.45 μm (PTFE No. 199-2020 supplied by Nalge Co.), and the filtrate was used as the catalyst dispersion for polymerization of acetylene.

The catalyst dispersion was coated on the wall surface of a polymerization reactor being rotated, and acetylene monomer which had been purified in advance by passing through a 30% by weight solution of triethylaluminum in liquid paraffin was supplied under a pressure of 760 mmHg. Polymerization was carried out at room temperature for 5 hours. After initiation of the polymerization, the polymerization gradually proceeded in the coated catalyst dispersion on the inner wall of the reactor, and a reddish brown polyacetylene film having a metallic luster was formed. After termination of the polymerization, acetylene was changed over to argon to form an argon atmosphere in the reactor. The catalyst dispersion was removed in the argon atmosphere, and the film was washed several times with 500 ml of toluene which had been deaerated in advance with argon. Then, the film was washed several times with a 10% solution of HCl in methanol and the film was washed with methanol repeatedly until the pH value became substantially neutral. Then, the film was dried at room temperature in argon. The obtained polyacetylene film had a thickness of 0.05 mm and a metallic silver luster. The film could be drawn at a draw ratio of about 6 at room temperature in air. The film drawn at a draw ratio of 6 was immersed in a solution of aluminum trichloride (AlCl$_3$) having a concentration of 0.05 mol/l of nitromethane whereby the film was doped with aluminum trichloride. The electroconductivity was measured at room temperature by the four-probe method. The draw ratio and the electroconductivity measured after the AlCl$_3$ doping are shown in Table 1.

EXAMPLE 2

The procedures of Example 1 were repeated in the same manner except that the time of aging at 200° C. was changed to 30 minutes and after this aging, the catalyst dispersion was rapidly cooled to room temperature and again heated to 200° C. at which the aging was carried out for 30 minutes, followed by rapid cooling, to obtain a catalyst dispersion for polymerization. Furthermore, a syringe filter having a pore diameter of 0.45 μm (Nylon Acrodisc No. 2590 4FIT-NY, supplied by Gelman Sciences Inc.) was used instead of the syringe filter having a pore diameter of 0.2 μm for purification of the catalyst dispersion. The polymerization and washing were carried out in the same manner as described in Example 1. The thus-obtained film could be drawn at a draw ratio of about 6.2. The film drawn at a draw ratio of about 6.2 was placed in contact with iodine vapor at room temperature to be thereby doped with iodine. The drawability of the obtained polyacetylene film and the electroconductivity measured after the iodine doping by the four-probe method are shown in Table 1.

EXAMPLE 3

The procedures of Example 1 for the polymerization and washing were repeated in the same manner except that the aging of the catalyst (i.e., the step of heating at 200° C. for 30 minutes followed by rapid cooling) was repeated three times. The drawability of the obtained film and the electroconductivity measured after the iodine doping are shown in Table 1.

EXAMPLE 4

Polymerization of acetylene and washing of the film were carried out in the same manner as described in Example 2 except that a syringe filter having a pore diameter of 0.2 μm (PTFE No. 199-2020 supplied by Nalge Co.) was used for purification of the catalyst dispersion instead of the syringe filter having a pore diameter of 0.45 μm. The drawability of the obtained polyacetylene film and the electroconductivity measured after the iodine doping are shown in Table 1.

EXAMPLE 5

Polymerization of acetylene and washing of the film were carried out in the same manner as described in Example 1 except that a silicone oil (polydimethylsiloxane supplied under the tradename of KF96 (30CS) by Shin-Etsu Chem. Co.) was used as the polymerization medium instead of decalin. The drawability of the obtained polyacetylene film and the electroconductivity measured after the iodine doping are shown in Table 1.

COMPARATIVE EXAMPLE 1

A solution of a catalyst comprising Ti(O-n-C$_6$H$_4$CH$_3$)$_2$(O-n-C$_4$H$_9$)$_2$ and triethylaluminum at an Al/Ti molar ratio of 4 in hexane as the solvent was aged for 10 hours at a boiling temperature (68° C.) in a flask equipped with a reflux cooler. The catalyst solution was cooled to room temperature, charged in a tubular-polymerization reactor, and hexane was gradually evaporated by a vacuum pump while rotating the reactor. When hexane was distilled out and the flowability of the catalyst solution was lost, acetylene gas was introduced into the reactor, and polyacetylene was synthesized on the wall surface of the reactor. After the synthesis, the polyacetylene film was taken out, washed with hexane as the solvent, dried in nitrogen gas and drawn by using a drawing machine. A polyacetylene film drawn at a draw ratio of about 6 was obtained. The drawn polyacetylene film was doped with iodine The maximum value of the electroconductivity after the iodine doping was about 2,000 S/cm.

The drawability of the obtained film and the electroconductivity after the iodine doping are shown in Table 1.

REFERENTIAL EXAMPLES 1, 2 AND 3

In Referential Example 1, the polymerization and washing were carried out in the same manner as described in Example 1 except that the purification of the catalyst dispersion by filtration using the syringe filter was not carried out. The results are shown in Table 1.

In Referential Examples 2 and 3, the polymerization and washing were carried out in the same manner as described in Examples 2 and 3, respectively, except that the purification of the catalyst dispersion by filtration using the syringe filter was not carried out. The results are shown in Table 1.

TABLE 1

|  | Frequency of aging (times) | Purification by filtration | Pore diameter of filter (μm) | Draw ratio of film | Electroconductivity after doping (S/cm) |
| --- | --- | --- | --- | --- | --- |
| Example 1 | 1 | Conducted | 0.45 | 6.0 | *1.1 × 10$^5$ |
| Example 2 | 2 | Conducted | 0.45 | 6.2 | 1.3 × 10$^5$ |
| Example 3 | 3 | Conducted | 0.45 | 6.0 | 1.2 × 10$^5$ |
| Example 4 | 2 | Conducted | 0.2 | 6.5 | 1.5 × 10$^5$ |
| Example 5 | 1 | Conducted | 0.2 | 5.0 | 1.2 × 10$^5$ |
| Comparative Example 1 | 2 | Not conducted | — | 6.0 | 2.0 × 10$^3$ |
| Referential Example 1 | 1 | Not conducted | — | 3.5 | *8.0 × 10$^3$ |
| Referential Example 2 | 2 | Not conducted | — | 4.1 | 3.2 × 10$^4$ |
| Referential Example 3 | 3 | Not conducted | — | 3.8 | 1.5 × 10$^4$ |

*In Example 1 and Referential Example 1, the film was doped with AlCl$_3$ and in the other examples the film was doped with iodine.

sured after the iodine doping are shown in Table 1.

The present invention is characterized in that the temperature for heating the organic solvent is maintained at a level not lower than 150° C. and the aged catalyst is purified by removing coarse catalyst particles having a diameter of larger than 1 μm, and by dint of these characteristic features, the polyacetylene film obtained by the present invention has an electroconductivity comparable to that of a metal. Furthermore, in the present invention, when the aging treatment is represented a plurality of times, the resulting polyactylene film has a higher electroconductivity than that of the film obtained by conducting the aging treatment only one time.

The polymer obtained by the present invention can be utilized as a semiconductor for an optical sensor, a gas sensor material or a battery electrode material or as a conductor for an electric wire, a heat generator, a resistor element, an electromagnetic screening board, an antistatic material or a light-weight electroconductive material, and it is expected that the polymer will be a valuable industrial material in the future.

Since the electroconductive polyacetylene proposed by the present invention is obtained in the form of a film on a substrate, the polyacetylene has an excellent adhesion to the substrate. Moreover, since the polyacetylene is formed on a coating of the catalyst on the substrate, a homogeneous electroconductive polyacetylene film can easily be formed even on a fiber and other substrates having a complicated shape.

We claim:

1. A process for the preparation of a polyacetylene film, which comprises (a) heating a Ziegler-Natta catalyst comprising an alkylaluminum compound and a titanium compound at a temperature not lower than 150° C. but below the decomposition temperature of the catalyst in an organic solvent and then, cooling the catalyst-organic solvent mixture said organic solvent having a boiling point of from 150° C. to 300° C. and being selected from the group consisting of saturated hydrocarbons, aromatic hydrocarbons and organic silicon compounds, (b) removing coarse catalyst particles having a diameter larger than 1 μm from the catalyst-organic solvent mixture to form a catalyst dispersion for polymerization, (c) contacting acetylene with the catalyst dispersion at a temperature of from −78° C. to 50° C. to effect polymerization of acetylene, and (d) drawing the formed polyacetylene film.

2. A process for the preparation of a polyacetylene film according to claim 1, wherein the removal of the coarse catalyst particles is carried out by using a filter having a pore diameter of 0.2 to 0.5 μm.

3. A process for the preparation of a polyacetylene film according to claim 1, wherein the heating-cooling treatment of the catalyst-organic solvent mixture is repeated 2 to 4 times.

4. A process for the preparation of a polyacetylene film according to claim 1, wherein the heat treatment of the catalyst-organic solvent mixture is carried out at a temperature of 150° to 260° C. for 20 to 120 minutes.

5. A process for the preparation of a polyacetylene film according to claim 1, wherein the Ziegler-Natta catalyst comprises titanium tetrabutoxide and triethylaluminum.

6. A process for the preparation of a polyacetylene film according to claim 1, wherein the concentration of the transitional metal compound of the Ziegler-Natta catalyst in the catalyst dispersion is 0.05 to 1.4 mole/l and the molar ratio of the organic metal compound to the transitional metal compound is 1 to 5.

7. A process for the preparation of a polyacetylene film according to claim 1, which further comprises the step of treating the drawn polyacetylene film with a dopant.

8. A process for the preparation of a polyacetylene film according to claim 7, wherein the dopant is iodine or aluminum trichloride.

* * * * *